United States Patent [19]

Botros

[11] 4,330,690
[45] May 18, 1982

[54] TELEPHONE GROUP LISTENING SYSTEMS

[75] Inventor: Radamis Botros, Nepean, Canada

[73] Assignee: Northern Telecom Limited, Montreal, Canada

[21] Appl. No.: 150,434

[22] Filed: May 5, 1980

[51] Int. Cl.³ .................. H04M 1/60; H04M 1/20
[52] U.S. Cl. .............................. 179/81 A; 179/1 FS
[58] Field of Search ............ 179/1 H, 1 HF, 1 CN, 179/1 F, 1 FS, 81 B, 81 A, 100 L

[56] References Cited

U.S. PATENT DOCUMENTS 3,109,893 10/1963 Burns .......................... 179/1 HF
3,928,723 12/1975 Kai ............................. 179/1 FS Primary Examiner—Bernard Konick
Assistant Examiner—J. A. Popek
Attorney, Agent, or Firm—Stuart L. Wilkinson

[57] ABSTRACT

A telephone group listening system is one in which one member of an assembled group has a telephone for communication with a remote party while the other members may only listen to the communication through the agency of a loudspeaker. The system is subject to the Larsen effect on call answering or clear down if the telephone handset is normally sited close to the loudspeaker. This effect is overcome by including a proximity switch in the loudspeaker circuit, the switch being triggered by a change in the level of coupling of a capacitively or inductively coupled circuit, the coupling being dependent on the closeness of the speaker's body to the switch or on the separation of the handset and the loudspeaker.

9 Claims, 5 Drawing Figures

4,330,690

TELEPHONE GROUP LISTENING SYSTEMS

BACKGROUND OF THE INVENTION

1. Field of the Invention

This invention relates to telephone station apparatus.

Recent years, especially in business communications, have seen the advent of the loudspeaker telephone terminal by means of which several conferees can speak and listen, at one location, to other conferees at a remote location. A hybrid of this and conventional person-to-person calling is the group listening system. In this system, one of an assembled group of people has access to a telephone permitting telephone conversation with a remote party, the telephone being connected to a loudspeaker which, when switched on, emits an amplified version of the telephone receiver output. This enables one of the group to interact with the remote party while the rest of the group are passive listeners. It is a useful service in, for example, a stockbroking environment in which one share dealer might be negotiating a particular deal, and other dealers, although not active parties in the deal, need to know directly if the deal is consummated since it might have appreciable impact on the subsequent price of the relevant share.

A problem arises if the loudspeaker is switched on by a gravity switch immediately the telephone handset is lifted from a base set housing the loudspeaker. An acoustic feedback path is produced between the telephone microphone transmitter and the loudspeaker so as to complete a feedback loop extending around the loudspeaker circuit. The acoustic feedback can produce howling at the loudspeaker, this phenomenon being well-known and termed the Larsen effect. As the microphone transmitter is moved away from the loudspeaker, the feedback loop is weakened and howling dies out allowing the system to be used normally. However, the initial noise is subjectively unpleasant.

2. Description of the Prior Art

Several proposals have been made for overcoming this problem. For example, the feedback loop can be made very lossy by lowering the gain of an amplifier controlling the loudspeaker input. This can, however result in an inadequate receive level for the listening group.

Alternatively a manually operable switch can be mounted on the base set. Unfortunately such a switch can easily be forgotten. If this occurs at the beginning of a call, information to the listening parties is lost; if at the end, howling results immediately prior to call termination as the handset is restored to the base set.

Another possible solution is the insertion of a time delay between the handset being lifted from the gravity switch and the loudspeaker being switched on. However the problem of howling when clearing down remains. In addition, the handset, when picked up, may not be moved directly away from the loudspeaker.

More complex schemes requiring signal processing are known, for example, that described in U.S. Pat. No. 3,787,621. These schemes appear to be particularly adapted not for group listening terminals, but for systems in which reception is by a loudspeaker only, or systems in which the telephone receiver and the loudspeaker are operated exclusively of one another.

SUMMARY OF THE INVENTION

According to one aspect of the invention there is provided telephone apparatus comprising a handset housing a microphone transmitter; a base set housing a loudspeaker; a transmission bridge for transmitting an output of the microphone transmitter to line and for transmitting an input from line to the loudspeaker; a switch between said transmission bridge and the loudspeaker for controlling input to the loudspeaker; and transducer means within the handset operable to actuate said switch when said handset is within a preset positional range relative to the base set, and to actuate said switch as said handset enters and exits said range.

The transducer means can be responsive to an output from a corresponding transducer means within the base set or can alternatively be responsive to the handset being held adjacent the telephone user's ear.

For example, the transducer means can comprise an emitting coil and a pick-up coil, one of the coils being housed in the base set and the other in the handset, the switch being operable according to the level of inductive coupling between the coils. Alternatively the transducer means can comprise a pair of concentric conducting rings formed on the handset adjacent the telephone receiver, the switch being responsive to the level of capacitive coupling between the rings when adjacent the telephone user's head.

BRIEF DESCRIPTION OF THE DRAWINGS

Embodiments of the invention will now be described by way of example with reference to the accompanying drawings, in which.

DESCRIPTION OF THE PREFERRED EMBODIMENT

Figure 1:
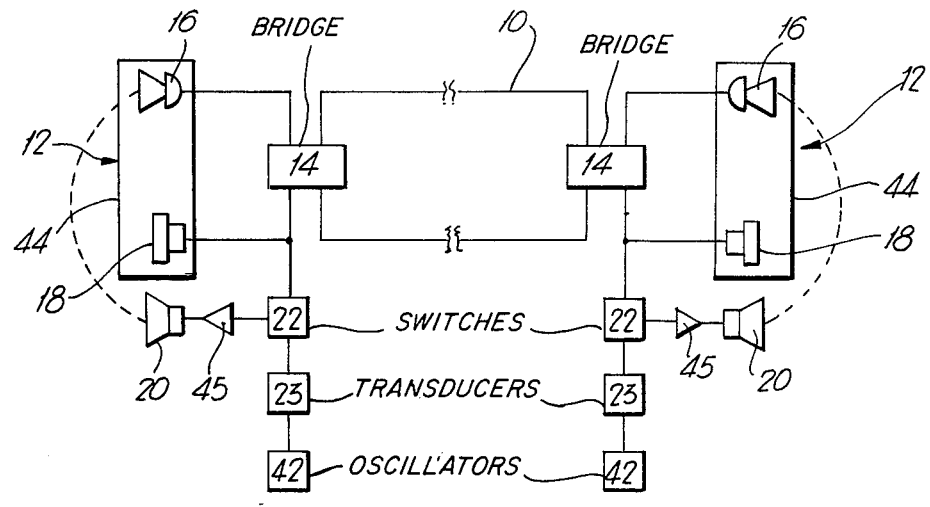
FIG. 1 shows, schematically, a group listening system in which the Larsen effect is suppressed using an automatic switch.
Figure 5:
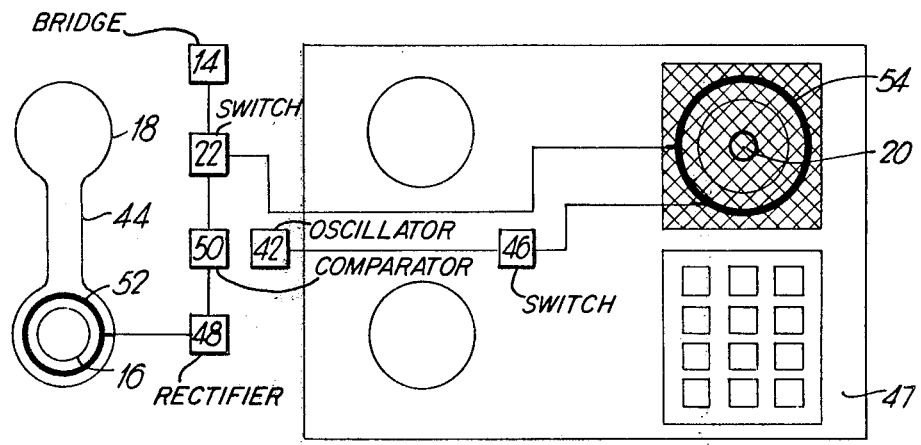
FIGS. 4 and 5 show part sectional and part schematic plan views respectively of an inductive transducer used to control an alternative proximity switch for use in the FIG. 1 system.

Referring in detail to FIG. 1, transmit and receive lines 10 of a telephone circuit are connected at each station 12 to transmission bridges 14, each bridge 14 being connected to a microphone transmitter 16, a telephone receiver 18 and a loudspeaker 20. The microphone transmitter 16 and the telephone receiver 18 are housed within a handset 44 and the loudspeaker 20 is housed within a base set 47 (FIG. 5). The receiver 18 can be used alone or an input from hybrid transmission bridge can be additionally directed to the loudspeaker 20 so that one of an assembled group of people holds the telephone handset 44, to converse with a remote party while others of the assembled group may listen passively to the conversation through the agency of the loudspeaker 20.

As indicated previously, there is a problem immediately after call answering and immediately before cleardown in that the microphone transmitter 16 is so close to the loudspeaker 20 that acoustic feedback (broken line) from the loudspeaker 20 to its associated microphone 16 can be fed around the loudspeaker circuit. If the gain of an amplifier 45 driving loudspeaker 20 is sufficiently high to overcome losses within the feedback loop, the loudspeaker will howl.

The problem is solved using an automatic loudspeaker switch 22 in conjunction with a transducer 23.

Figure 2:
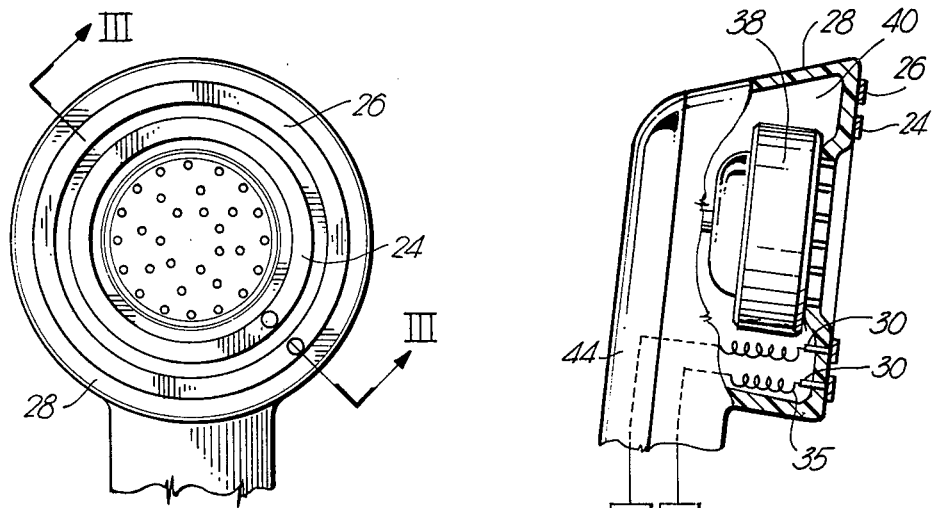
FIGS. 2 and 3 show plan and part schematic sectional views respectively of a capacitive transducer used to control a proximity switch for use in the FIG. 1 system.
Figure 3:
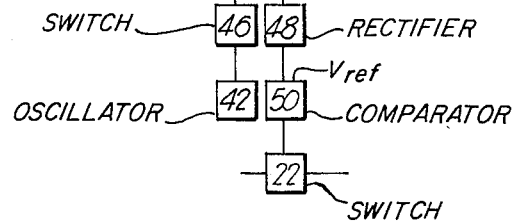

In the embodiment of FIGS. 2 and 3, a capacitive transducer comprising a pair of concentric rings 24 and 26 of indium tin oxide is thick film printed on the outer surface of a handset receiver cap 28. Each of the rings 24 and 26 has a conducting terminal 30 projecting through the cap 28 into a chamber 40 housing a receiver unit 38. Also housed within the handset is a tone generator 42 connected via a gravity switch 46 to ring 24. When the telephone handset 44 is first lifted, the gravity switch 46 switches the tone generator output to the ring 24. Capacitive coupling between the rings 24 and 26 is initially relatively low owing to the air and plastic dielectric between the two rings. However, when the handset is brought to the telephone user's ear, the dielectric between the rings 24 and 26 changes owing to the presence of the user's body. An increased oscillatory signal then couples into the ring 26, passes to a rectifier 48, and is then compared to a reference signal at a comparator 50. An output from the comparator actuates switch 22 controlling the loudspeaker 20 when capacitive coupling between the rings 24 and 26 reaches a preset level. The reference signal is chosen such that the handset is normally about a half meter from the base set when the switch 22 operates. In this position, allowing for loss in the transmission bridge and the acoustic path between the loudspeaker 20 and the microphone 16, adequate gain can be introduced at the loudspeaker amplifier 45 with no danger of the Larsen effect occurring. The tone generator 42, and the switch circuit including rectifier 48 and comparator 50 are housed at a convenient location within the handset and are connected to the terminals 30 by conducting leads 35.

Figure 4:
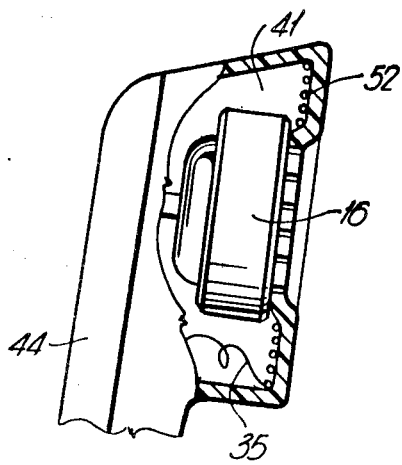

The embodiment of FIGS. 4 and 5 is similar in many respects to that of FIGS. 2 and 3, so like reference numerals are used to designate like features.

In this embodiment, the base set 47 houses an emitter coil 54. The emitter coil 54 is energized by the oscillator 42 to produce an oscillating magnetic field when the gravity switch 46 is operated on lifting the handset 44.

At the handset 44, a pick-up coil 52 is located within a chamber 41 which also houses the microphone transmitter 16. Also housed within the handset are the receiver 18, rectifier 48, comparator 50 and loudspeaker switch 22, the latter having connection leads 35 to the transmission bridge (not shown) and the loudspeaker 20. An output from the comparator 50 actuates the switch 22 when inductive coupling between the emitter and pick-up coils 54 and 52 falls below a preset level.

In contrast with the FIG. 2 embodiment in which switching depends on ear-handset positional relationship, switching of the FIG. 4 embodiment depends on the handset-base set positional relationship.

By mounting the emitter coil at the base set and the pick-up coil at the microphone transmitter 16, the inductive coupling path is made almost the same length as the acoustic feedback path. Since the acoustic feedback path is both length and direction dependent, the fidelity of inductive coupling to acoustic feedback is improved by mounting the emitter and pick-up coils 54 and 52 so that change in acoustic feedback consequent on reorientation of the microphone transmitter 16 relative the loudspeaker 20 is mirrored by a corresponding change in inductive coupling. In the embodiment of FIGS. 4 and 5, the emitter coil 54 is mounted concentrically with a conical vibrating chamber of the loudspeaker 20 and the pick-up coil 52 is mounted concentrically with the cylindrical microphone transmitter 16.

In both embodiments an oscillatory frequency of 50-100 KHz is convenient since this range is appreciably higher than the range of audible frequencies so that interference will not occur.

What is claimed is:

1. Telephone apparatus comprising:
   a handset housing a microphone transmitter;
   a base set housing a loudspeaker;
   a transmission bridge for transmitting an output of the microphone transmitter to a telephone line and for transmitting an input from said telephone line to the loudspeaker;
   a switch between said transmission bridge and the loudspeaker for controlling input to the loudspeaker;
   and transducer means within the handset operable to actuate said switch when said handset enters and exits a preset positional range relative to the base set, whereby to inhibit input to the loudspeaker when the handset is within said preset range but to pass the input to the loudspeaker when the handset is outside said preset range.

2. Telephone apparatus as claimed in claim 1, in which said transmission bridge is operable to transmit said input to a telephone receiver housed within the handset, the transducer means being located at said handset adjacent the receiver, and being responsive to the receiver being placed adjacent to a listener's ear whereby to actuate said switch.

3. Telephone apparatus as claimed in claim 2, in which said transducer means is a capacitive transducer.

4. Telephone apparatus as claimed in claim 3, in which the capacitive transducer means includes a pair of concentric conductors printed on an outer surface of the handset, the conductors having conducting terminals extending into the handset.

5. Telephone apparatus as claimed in claim 4, further comprising means for applying an oscillating signal to one of the concentric conductors, and a comparator connected to the other concentric conductor, the comparator being operable to compare the level of an oscillating signal capacitively coupled from said one concentric conductor to the other concentric conductor to a reference level, an output from the comparator actuating the switch when such capacitive coupling rises above the reference level.

6. Telephone apparatus as claimed in claim 1, in which the transducer means is an inductive transducer.

7. Telephone apparatus as claimed in claim 6, in which the inductive transducer comprises one coil in the handset and another coil in the base set, an oscillator for impressing an oscillatory signal on one of the coils with the other coil adapted to function as an inductive pick-up coil, and a comparator connected to the pick-up coil, the comparator operable to compare the level of an oscillating signal within the pick-up coil to a reference level, an output from the comparator actuating the switch when inductive coupling between the coils drops below the reference level.

8. Telephone apparatus as claimed in claim 7, in which one of the coils is wound on an axis co-extensive with a central axis of the microphone transmitter and the other coil is wound on an axis co-extensive with a central axis of the loudspeaker.

9. Telephone apparatus as claimed in claim 8, in which said positional range is a function both of distance and the inclination of the axes relative to one another.

* * * * *